United States Patent
Maddah et al.

(10) Patent No.: US 9,619,881 B2
(45) Date of Patent: Apr. 11, 2017

(54) METHOD AND SYSTEM FOR CHARACTERIZING CELL POPULATIONS

(71) Applicant: Cellogy, Inc., Menlo Park, CA (US)

(72) Inventors: Seyyedeh Mahnaz Maddah, Menlo Park, CA (US); Kevin Loewke, Menlo Park, CA (US)

(73) Assignee: Cellogy, Inc., Menlo Park, CA (US)

( * ) Notice: Subject to any disclaimer, the term of this patent is extended or adjusted under 35 U.S.C. 154(b) by 109 days.

(21) Appl. No.: 14/492,385

(22) Filed: Sep. 22, 2014

(65) Prior Publication Data

US 2015/0087240 A1    Mar. 26, 2015

Related U.S. Application Data

(60) Provisional application No. 61/882,889, filed on Sep. 26, 2013.

(51) Int. Cl.
*G06K 9/00* (2006.01)
*G06T 7/00* (2017.01)
*G06T 7/60* (2017.01)

(52) U.S. Cl.
CPC ........ *G06T 7/0012* (2013.01); *G06K 9/00147* (2013.01); *G06T 7/0016* (2013.01); *G06T 7/0081* (2013.01); *G06T 7/0087* (2013.01); *G06T 7/60* (2013.01); *G06T 2207/20081* (2013.01); *G06T 2207/30024* (2013.01)

(58) Field of Classification Search
None
See application file for complete search history.

(56) References Cited

U.S. PATENT DOCUMENTS

| | | | |
|---|---|---|---|
| 7,369,696 B2 | 5/2008 | Arini et al. | |
| 7,920,736 B2 | 4/2011 | Sammak et al. | |
| 2010/0260406 A1* | 10/2010 | Sammak | G06K 9/00127 382/133 |
| 2012/0134571 A1 | 5/2012 | Ito et al. | |
| 2013/0073221 A1* | 3/2013 | Attinger | G06F 19/70 702/30 |
| 2013/0188070 A1* | 7/2013 | Lee | H04N 5/23219 348/222.1 |
| 2015/0212070 A1* | 7/2015 | Lin | G01N 33/5029 435/287.1 |

* cited by examiner

Primary Examiner — Sean Conner
(74) Attorney, Agent, or Firm — Jeffrey Schox; Ivan Wong

(57) ABSTRACT

A method and system for characterizing a cell population including a set of cell subpopulations, the method comprising: at a processing system, receiving image data corresponding to a set of images of the cell population captured at a set of time points; at the processing system, generating an analysis based upon processing the set of images according to: a cell stage classification module configured to automatically identify a cell class of each of the set of cell subpopulations, and a cell graph representation module configured to characterize geometric and spatial features of the set of cell subpopulations; from the analysis, determining a set of parameters characterizing the cell population; and generating an indication of quality of the cell population based upon a comparison between at least one parameter of the set of parameters and a set of reference values.

10 Claims, 9 Drawing Sheets

METHOD AND SYSTEM FOR CHARACTERIZING CELL POPULATIONS

CROSS-REFERENCE TO RELATED APPLICATIONS

This application claims the benefit of U.S. Provisional Application Ser. No. 61/882,889 filed 26 Sep. 2013, which is incorporated in its entirety herein by this reference.

TECHNICAL FIELD

This invention relates generally to the sample imaging field, and more specifically to a new and useful method and system for characterizing cell populations.

BACKGROUND

Efficient and low-cost characterization of cell lines is of great interest due to applications in research, clinical, and pharmaceutical settings. In research and clinical settings, characterization of cellular responses from cell populations of patients or donors can provide insight into the effects of applied experimental conditions. With regard to pharmaceutical applications, characterization of cellular responses to a new drug in preclinical testing, at individual and population levels, can provide insight into the effectiveness of the new drug or detrimental effects of the new drug. In particular, in recent years, there has been significant progress in using induced pluripotent stem cells (iPSCs) and other cell types for modeling of human disease. For instance, somatic cells can be reprogrammed into a pluripotent state and then differentiated into specific cell types for disease modeling. Such disease-in-dish models can provide insight into studying cellular disease mechanisms and responses to drugs, with the goal of treating a disease. However, characterization in an efficient and low-cost manner has not been successfully achieved. Furthermore, standardization in the evaluation of iPSC cultures and other types of cell cultures is often limited by variations in sensitivity to culture conditions attributed to different cell types. Appropriate methods and systems for evaluating iPSC cultures and other cell cultures should be capable of: characterizing cultures at a distribution of time points, minimally affecting the cell cultures, and handling variations in cell line stability and culture conditions (e.g., culture density, media composition, reagent lot variability, user technique).

Thus, there is a need in the sample imaging field to create a new and useful method and system for characterizing cell populations. This invention provides such a useful method and system.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Method

Figure 1A:
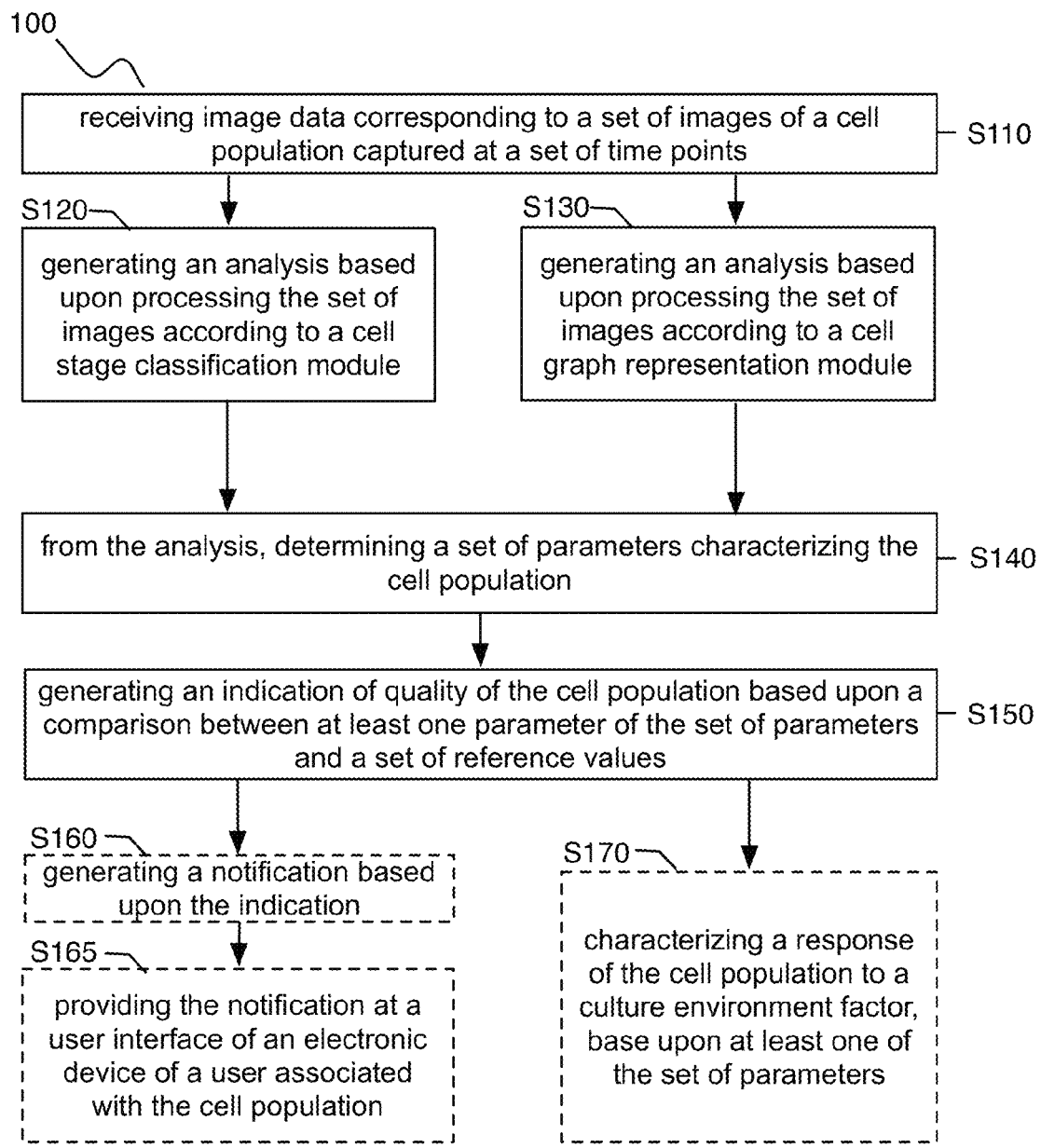
FIGS. 1A-1B depict embodiments of a method for characterizing cell populations.

As shown in FIG. 1A, an embodiment of a method 100 for characterizing a cell population, including a set of cell subpopulations, comprises: receiving image data corresponding to a set of images of the cell population captured at a set of time points S110; generating an analysis based upon processing the set of images according to a cell stage classification module configured to identify a cell stage of each of the cell subpopulations S120 and a cell graph representation module configured to characterize features of the set of cell subpopulations S130; from the analysis, determining a set of parameters characterizing the cell population S140; and generating an indication of quality of the cell population based upon a comparison between at least one parameter of the set of parameters and a set of reference values S150. In some embodiments, the method 100 can additionally include one or more of: generating a notification based upon the indication S160; providing the notification at a user interface of an electronic device of a user associated with the cell population S165; and characterizing a response of the cell population to a culture environment factor, based upon at least one of the set of parameters S170.

The method 100 functions to facilitate evaluation of a cell population in vitro in generating parameters that can be used to classify cell subpopulations of the cell population. The method 100 can further function to enable phenotypic expressions of a portion and/or an entirety of a cell population to be assessed over time. In particular, embodiments of the method 100 can be used to automatically evaluate iPSC cultures for culture quality and other parameters using time-lapse imaging and algorithmic modules configured to extract relevant features (e.g., morphological features, features related to cell dynamics) from image data of the iPSC cultures. In one specific application, the method 100 provides a non-invasive and automated method for evaluating iPSC cultures using time lapse imaging and algorithmic processes to measure biologically relevant features related to iPSC morphology and dynamics, and uses the features to develop a ranking system for iPSC quality. As such, the method 100 preferably provides substantially non-invasive techniques for evaluating cell populations, but can additionally or alternatively include minimally invasive or invasive techniques for evaluating cell populations.

The method 100 preferably enables multiple cell subpopulations within each of a set of cell cultures to be evaluated and/or classified; however, the method 100 can additionally or alternatively facilitate characterization of any suitable portion(s) (e.g., a single cell population) of any number of cell cultures. The method 100 can allow responses of cell populations to experimentally applied conditions (e.g., exposure to doses of therapeutic substances) to be assessed at a subpopulation level. In a specific application, the method 100 can characterize or classify cell stages of iPSC cultures at a subpopulation level, wherein parameters related to quality of the cultures are highly relevant. In variations of the specific application, the iPSCs can be patient sourced or sourced from any other suitable donor, and/or can be cultured with any suitable factor configured to induce a cellular response, which can then be validated according to the method 100. However, the method 100 can additionally or alternatively be adapted for characterization of any other suitable biological sample of cells or tissues. The method 100 is preferably performed at least in part at an embodiment of the system 200 described in Section 2 below, which can enable cell cultures to be monitored remotely and characterized automatically; however, the method 100 can be performed at any other suitable system or number of systems.

Block S110 recites: receiving image data corresponding to a set of images of a cell population captured at a set of time points, which functions to receive data that can be processed to determine a set of parameters characterizing the subpopulations of the cell population. The image data is preferably received continuously and in near real time; however, the image data can be received non-continuously and/or in non-real time. The set of images preferably includes consistent images capturing the same view (e.g., view window, location, focal plane, etc.) of a culture substrate including the cell population (e.g., in culture), as generated using a system wherein relative positions between the culture substrate(s) and the optical sensor(s) capturing image data of the cell culture(s) are constant; however, in some variations, the image data can include images that are inconsistent in view, but processable to provide consistency in view (e.g., in view window, in location, in focal plane, etc.) across the set of images. The set of time points is preferably uniformly spaced, as defined by a constant capture frame rate, but can alternatively be non-uniformly spaced, as defined by a variable capture frame rate. Furthermore, the set of time points preferably spans a duration of time capturing a period of cell expansion and maintenance (e.g., iPSC expansion and maintenance), wherein cells can be vulnerable to sporadic changes and/or variations in their experimental environment (e.g., handling conditions, culture environment). In one variation, the set of images can span a duration of several days (e.g., 3-4 days), but in other variations, the set of images can span any other suitable duration of time (e.g., nanoseconds, milliseconds, seconds, minutes, hours, weeks, months, etc.)

In Block S110, image capture can be repeated any suitable number of times, with any suitable elapsed duration of time between imaging repetitions. In some variations, image capture can even be automatically triggered upon detection of an event within a cell culture (e.g., a disturbance of the cell culture, an identified flag related to a positive or negative condition within the cell culture, etc.) comprising the cell population, thereby enabling image capture in synchronization with the event. Thus, the image data is captured with an appropriate resolution, magnification, and frame rate in order to enable extraction of features of cells of the cell population in culture. However, the image data can alternatively be captured in any other suitable manner. In variations of the method 100 including capture of image data from multiple cell cultures, image capture parameters (e.g., frame rate, view, number of images) can be consistent or variable across the multiple cell cultures. Furthermore, the image data can be tagged with any suitable information, such as an experiment name, type of culture substrate (e.g., well plate type, culture dish type), number of samples per culture substrate, location of cell culture(s) within a substrate, capture frame rate, capture duration, number of imaging repetitions, and time elapsed between subsequent imaging repetitions. Furthermore, the image data can be processed or conditioned (e.g., enhanced, filtered, etc.), or otherwise manipulated in any other suitable manner. In one such variation, one of a set of images taken from a set of focal planes (e.g., as in a z-stack) at a location within a substrate can be used to condition or enhance other images of a set of images based upon an analysis of focus. However, images of the image dataset can be processed in any other suitable manner.

In Block S110, the image data can comprise images derived from any one or more of: phase contrast microscopy (e.g., low-light phase contrast microscopy), fluorescent microscopy, darkfield microscopy, brightfield microscopy, quantitative phase contrast microscopy, and any other suitable method of imaging live cell cultures. In variations wherein the image data comprises phase contrast microscopy-derived images, the images can comprise image data from one or more focal planes of a cell or cell population in culture, in order to derive additional information from the image data. However, the image data can alternatively comprise any other suitable type of image data.

Figure 1B:
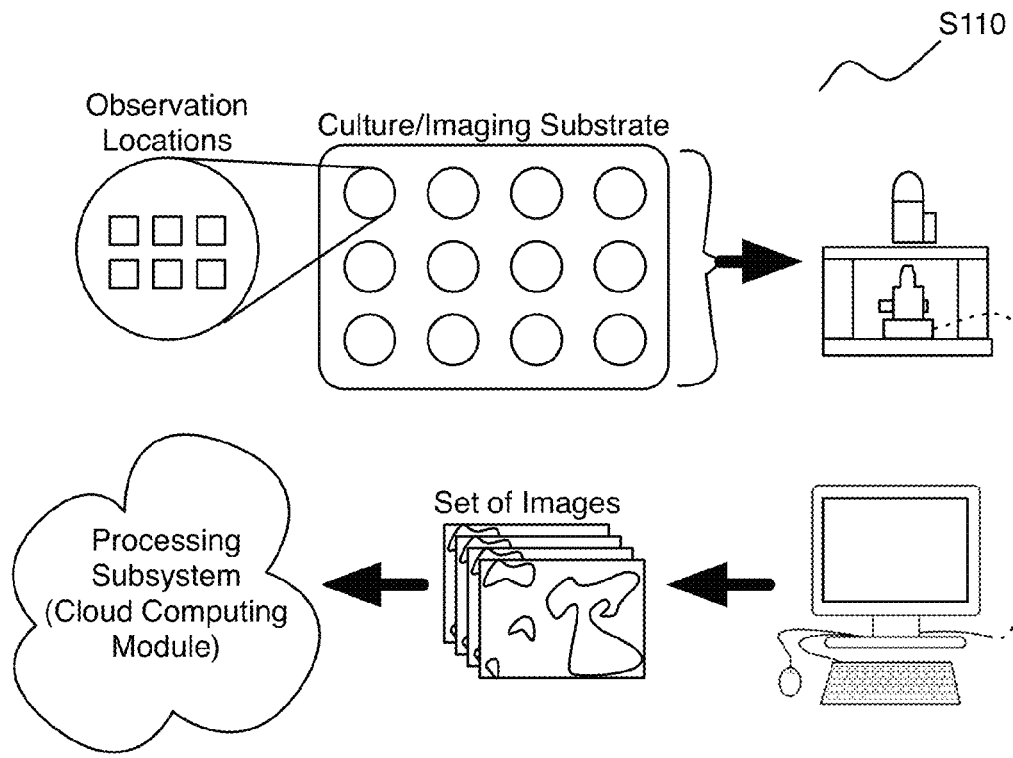

In a specific example for capture and characterization of a set of iPSC cell populations in culture, as shown in FIG. 1B, each of 94 iPSC populations in culture were imaged with 6 observation positions/locations per culture, resulting in 564 sets of time-lapse images. In the specific example, the sets of time lapse images comprise low-light phase contrast images taken at multiple focal planes, and for each of the 564 sets of time-lapse images, images were taken every 30 minutes for a period of 3-4 days at seven different focal planes (e.g., to produce a z-stack of seven images for each location and time point), until cell populations reached near confluency (e.g., 95% confluency). In the specific example, each culture was imaged using a CMOS optical sensor, as described in Section 2 below. In variations of the specific example, however, the image data for each sample can be captured at any other suitable frame rate (e.g., one frame every 1-60 minutes), for any other suitable duration (e.g., 1-30 days), with any other suitable number of focal planes, with any suitable number of repetitions of image capture, with any suitable time elapsed (e.g., one hour, two hours, etc.) between subsequent imaging repetitions, with any suitable illumination (e.g., illumination to detect fluorescence), and using any other suitable optical sensor. Furthermore, each cell culture can be defined at any other suitable substrate (e.g., 6-well plate, 12-well plate, 24-well plate, 48-well plate, 96-well plate, 384-well plate, culture dish, etc.), with any other suitable plating density, during image capture.

Figure 2A:
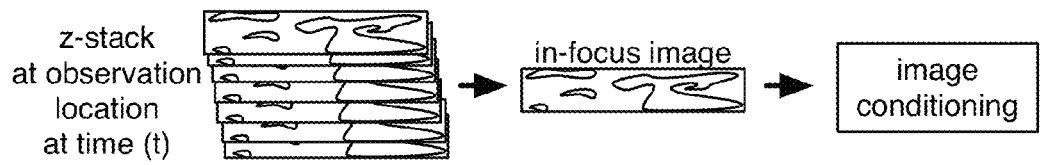
FIGS. 2A and 2B depict portions of an embodiment of a method for characterizing cell populations.

In the specific example, the image data was conditioned by using one of a set of images taken from a set of seven focal planes (e.g., as in a z-stack) at a location within a substrate, for each time point, as shown in FIG. 2A. As such, receiving image data comprises receiving images taken at a set of focal planes, for each of a set of locations spanning the cell population. In this example of conditioning, the most in-focus image from the set of seven focal planes was identified automatically based upon application of an edge-strength filter to assess feature sharpness within images from each of the seven focal planes. The most in-focus image was then corrected for background illumination inhomogeneity, enhanced for contrast, and corrected for drift (e.g., drift in x-y directions). Finally, at each location within a substrate and for each time point, the most in-focus image, post-correction, was used as a conditioned image for further processing according to other blocks of the method, as described in further detail below. Thus, one output of the specific example of Block S110 comprised a set of conditioned images corresponding to 6 locations within a cell culture, across a time period of 3-4 days, at a frame rate of 1 frame every 30 minutes.

In the specific example, the iPSC populations in culture comprise 12 separate clones across four iPSC lines. More specifically, skin fibroblasts (i.e., from two healthy patients and two patients with LRRK2 mutations as the four lines) were reprogrammed into iPSCs, and 16 iPSC clones were selected based upon an assessment of consistent pluripotent colony morphology, presence of normal karyotype, clearance of viral expression (e.g., resulting from reprogramming), and expression of pluripotent markers. All 16 iPSC clones were cultured in E8 medium on human embryonic stem cell (hESC)-qualified matrix, and were dissociated upon arrival at 95% confluency using 0.5 mM EDTA/PBS, followed by replating. After re-establishment, 12 of the 16 clones were selected and re-plated onto 12-well plates (e.g., in clusters of 5-20 cells), in order to generate the image data of the specific example of Block S110. In the specific example, imaging began 24-hours after re-plating onto 12-well plates, and culture environment conditions were maintained at 37° C. and 6.7% $CO_2$, with stress conditions comprising a temperature of 32° C. and/or 1.0% $CO_2$. However, variations of the specific example can comprise one or more of: non-clonally-derived iPSC cultures (e.g., cultures derived from bulk cultures of initial colonies of iPSC), clonally-derived iPSC cultures (e.g., cultures derived by selection of a single colony), and any other suitable cell-type derived or processed in any other suitable manner.

Figure 2B:
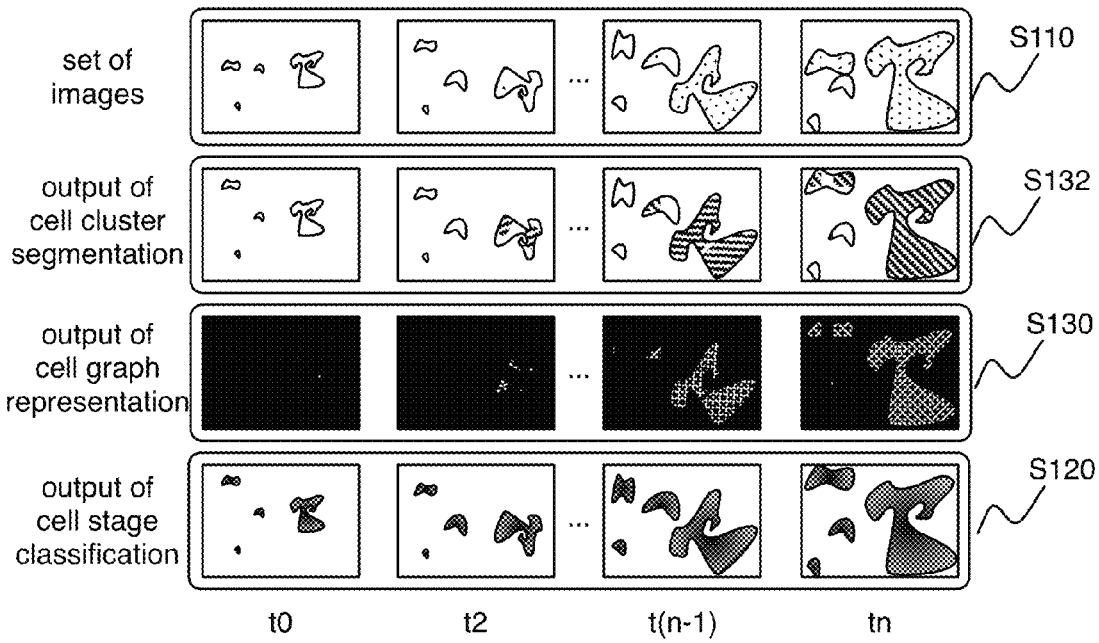

Block S120 recites: generating an analysis based upon processing the set of images according to a cell stage classification module, which functions to facilitate identification of a cell stage of each of the cell subpopulations based upon texture and intensity features. In Block S120, as shown in FIGS. 1A and 2B, patterns (e.g., textural patterns, intensity patterns) indicative of cell stage can be observed in relation to cell colony formation (e.g., iPSC colony formation), which can be used to classify the cell population and/or subpopulations of the cell population. In variations, the cell class can relate to one or more of a stage of compaction, a stage of differentiation, and any other suitable cell stage. In one example, the cell stage classification module can facilitate identification of a set of cell stages for a set of subpopulations of the cell population including one or more of: a single-cell stage, a medium-compaction stage, a full-compaction stage, a dead cell stage, a differentiated cell stage, a debris stage, and a background stage. As such, parameters derived from outputs of the cell stage classification module can be used to assess culture quality (e.g., as outputs of Block S140 and/or S150), wherein in examples, parameters derived from an identification of a medium-compaction stage can indicate stress or lack of proper culture conditions, parameters derived from an identification of a full-compaction stage can indicate proper culture conditions, and parameters derived from an identification of a differentiated cell stage can indicate poor culture conditions. The cell stage classification module can, however, facilitate identification of any other suitable cell stage for any other suitable indication.

Figure 3:
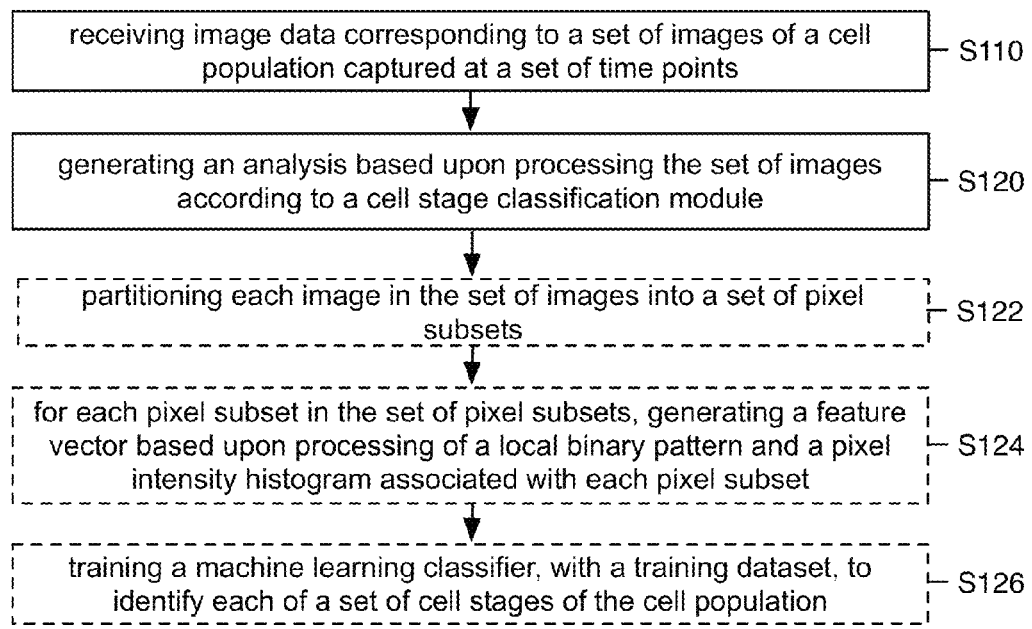
FIG. 3 depicts a variation of a portion of a method for characterizing cell populations.

As shown in FIG. 3, in Block S120, processing the set of images according to a cell stage classification module can comprise partitioning each image in the set of images into a set of pixel subsets S122, for each pixel subset in the set of pixel subsets for each image, generating a feature vector based upon processing of a local binary pattern and a pixel intensity histogram associated with each pixel subset S124, and training a machine learning classifier, with a training dataset, to identify each of the set of cell stages of the cell population captured in the set of images, using the set of feature vectors for each image in the set of images S126. Variations of Block S120 can, however, comprise any other suitable additional or alternative block configured to facilitate identification of cell stages of the cell population.

In Block S122, partitioning each image (e.g., a conditioned image, a raw image) in the set of images into a set of pixel subsets functions to divide each image into domains of pixel subsets, which can be processed (e.g., simultaneously, sequentially) to define a feature vector for each pixel subset as in Block S124. Every pixel subset in the set of pixel subsets can be uniform in size and shape; however, the set of pixel subsets can alternatively comprise non-uniformly sized and/or shaped pixel subsets. Preferably, each pixel subset in the set of pixel subsets includes pixels that overlap with at least one other pixel subset in the set of pixel subsets; however, the set of pixel subsets can alternatively include non-overlapping pixel subsets in some variations. Furthermore, each pixel subset is preferably a rectangular array of pixels; however, the set of pixel subsets can alternatively include pixel subsets defined as one or more of: a circular array, an ellipsoidal array, a polygonal array, or an amorphous array. In a specific example, every image of the set of images is partitioned to pixel subsets defined as arrays of 51×51 pixels, wherein each pixel subset overlaps with at least one other pixel subset at a boundary. Partitioning can be performed independent of and/or during processing of each image according to a location binary pattern and a pixel intensity histogram, as described in further detail below. However, Block S122 can alternatively be performed in any other suitable manner.

In Block S124, generating the feature vectors comprises processing a local binary pattern and at least one pixel intensity histogram associated with each pixel subset. The local binary pattern preferably facilitates texture-based classification of the set of cell stages according to a computer vision algorithm. In constructing a local binary pattern (LBP), each image in the set of images is preferably processed according to expression [1] to produce $L_{P,R}(m,n)$, where M×N is the dimension of the image (e.g., in number of pixels per row by number of pixels per column), I(m,n) is a foreground pixel of the image at location (m,n), and P and R are constants:

$$L_{P,R}(m,n) = \text{LBP}_{P,R}(I(m,n)), \text{ for } m=1,\ldots,M \text{ and } n=1,\ldots,N \quad [1]$$

In relation to expression [1] and Block S122, for each pixel I(n,m), a pixel subset I(m−k ... m+k, n−k ... n+k) is selected about the pixel I(n,m), wherein each pixel subset is a (2k+1)×(2k+1) subset of the image I. Then, the local binary pattern and pixel intensity histogram is determined over each pixel subset, whereby: 1) every other pixel in I(m−k ... m+k, n−k ... n+k) is compared to pixel I(n,m), and given a binary value of 1 or 0 if the value (i.e., intensity value) of the pixel is greater than or not greater than the value of pixel I(n,m) to define the local binary pattern and 2) for each pixel subset, the pixel intensity histogram is determined based upon the frequency of 1's and 0's from the local binary pattern. Then, for each pixel subset, a feature vector $F_{m,n}$ is defined at each pixel I(n,m) as a concatenation as in expression [2], where $b_I$ and $b_i$ are bins for LBP and intensity histograms, respectively, μ and v are position parameters, and hist is a histogram concatenation function:

$$F_{m,n}=[\text{hist}(\text{Intensity}(\mu v), b_i), \text{hist}(L_{P,R}(\mu, v), b_I)] \quad [2]$$

The feature vectors of Block S124 can be normalized (e.g., to a range of [−1,1]) or non-normalized for processing and training in subsequent blocks. Furthermore, in Block S126, the LBP for each image can alternatively be replaced by any other suitable case of a Texture Spectrum Model, and can additionally or alternatively be supplemented with or processed along with any other suitable histogram (e.g., histogram of oriented gradients). Furthermore, processing the feature vector(s) can be performed according to any other suitable image- or non-image-based parameter, in order to generate feature vectors associated with pixels of each image.

In Block S126, training the machine learning classifier functions to enable automatic identification of each of the set of cell stages captured in the set of images, by using a training dataset along with the set of feature vectors for each image. In Block S126, the training dataset is preferably processed with a support vector machine (SVM) for classification, and in one variation, can involve processing with a one-against-one multi-class SVM. In this variation, the training dataset preferably comprises a library of pixel subsets independently labeled (e.g., by an experienced entity in classification of cell cultures), wherein each pixel subset in the library is also processed to determine feature vectors (e.g., normalized feature vectors, non-normalized feature vectors) in a manner analogous to that of Blocks S122 and S124. In a specific example, the training dataset comprises a library of pixel subsets labeled (e.g., as a single-cell stage, as a medium-compaction stage, as a full-compaction stage, as a dead cell stage, as a differentiated cell stage, as a debris stage, and as a background stage) by an expert stem cell biologist, which is processed according to a linear SVM classifier with a Gaussian kernel in order to provide the machine learning classifier. Variations of Block S126 can additionally or alternatively include cross validation (e.g., k-fold cross validation, 5-fold cross validation) in order to obtain a high degree of classification accuracy in predicting labels/classes of the training dataset.

In relation to Block S126 and classification of a pixel subset as including a dead cell stage by the machine learning classifier, Block S126 can include further processing to identify regions below or otherwise integrated with (e.g., contiguous with) cells of a dead cell stage captured in an image. For instance, for a pixel subset that includes cells of a dead cell stage surrounded by a full-compaction stage of cells, the cell subpopulation(s) of the pixel subset can be identified as "a dead cell on top of full compaction region"; however, for a pixel subset that includes cells of a dead cell stage surrounded by a background stage, the cell subpopulation(s) of the pixel subset can be identified as "a dead cell stage". Thus, in variations of Block S120 and/or S126, identification of a specific stage of cells (e.g., a single-cell stage, a medium-compaction stage, a full-compaction stage, a dead cell stage, a differentiated cell stage, a debris stage, and a background stage) can motivate additional processing to further classify cell subpopulations of the cell population (e.g., as belonging to multiple classifications) captured in the set of images. Furthermore, the trained machine learning classifier of Block S126 can be used to automatically identify at least one of the set of cell stages within a second cell population, based upon application of the machine learning classifier to a second set of images of the second cell population.

While SVM-based machine learning classification is described above, Block S120 can additionally or alternatively utilize any other suitable machine learning algorithms. In variations, the machine learning algorithm(s) can be characterized by a learning style including any one or more of: supervised learning (e.g., using logistic regression, using back propagation neural networks), unsupervised learning (e.g., using an Apriori algorithm, using K-means clustering), semi-supervised learning, reinforcement learning (e.g., using a Q-learning algorithm, using temporal difference learning), and any other suitable learning style. Furthermore, the machine learning algorithm can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm.

Figure 4:
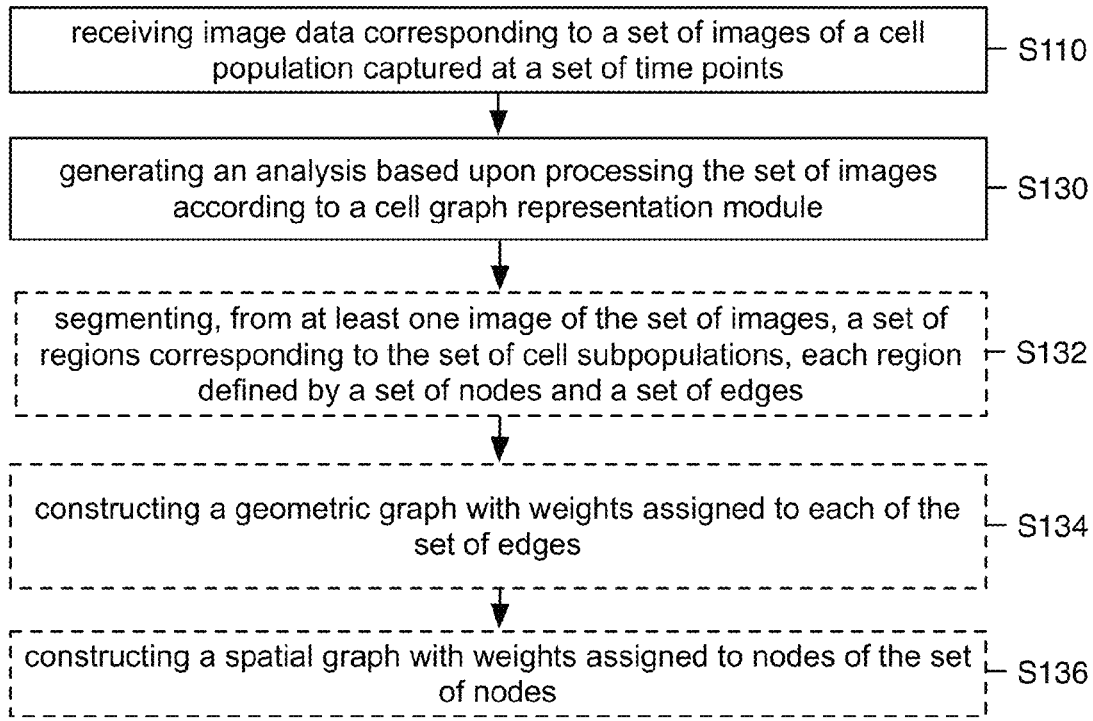
FIG. 4 depicts a variation of a portion of a method for characterizing cell populations.

Block S130 recites: generating an analysis based upon processing the set of images according to a cell graph representation module, which functions to facilitate characterization of geometric and spatial features of the set of cell subpopulations. Preferably, each of the set of cell subpopulations is processed into a model with nodes and edges, which can be used to determine shape, geometric, and spatial parameters of each of a set of cell subpopulations within a cell population, as well as geometric, and spatial parameters between cell subpopulations within a cell population. As shown in FIG. 4, in Block S130, processing the set of images according to a cell graph representation module can comprise segmenting, from at least one image of the set of images, a set of regions corresponding to the set of cell subpopulations of the cell population, each region defined by a set of nodes and a set of edges S132, constructing a geometric graph with weights assigned to each of the set of edges based upon at least one distance calculated between nodes of the set of nodes S134, and constructing a spatial graph with weights assigned to nodes of the set of nodes based upon associated areas of regions of the set of regions S136. Variations of Block S130 can, however, comprise any other suitable additional or alternative block configured to facilitate characterization of geometric and spatial features of the set of cell subpopulations.

In Block S132, segmenting the set of regions is preferably performed with a cell cluster segmentation module of a processing subsystem configured to remove background portions of an image from portions of an image representing cells of the cell population/cell subpopulation. The cell cluster segmentation module can segment the set of regions corresponding to the set of cell subpopulations based upon variations in image intensity across each of the set of images, as indicated by a statistical measure of variation in image intensity. In one variation, segmenting can comprise generating a local entropy map of image intensity for at least one image of the set of images, followed by thresholding to create a binary image. In Block S132, the binary image can be further processed to remove small regions (e.g., insignificant cell clusters) and voids (e.g., holes), however, some variations of Block S132 can omit further processing to remove small regions and holes. In this variation of Block S132, the binary image can then be processed with a region growing method (e.g., fast region growing method) based upon selection of a set of seed points (e.g., one seed point, multiple seed points) identified and corresponding to the set of regions, which can be used to provide a set of connected components from the image as a set of regions corresponding to a set of cell subpopulations. In Block S132, each region of the set of regions is preferably defined by a set of nodes and a set of edges. In further detail, nodes of the set of nodes can be defined based upon uniform sampling of each region of the set of regions, by determination of a center of mass for each region of the set of regions, or in any other suitable manner. Then, each edge of the set of edges is formed by constructing a triangulation (e.g., Delaunay triangulation, Pitteway triangulation) between nodes of the set of nodes. As such, outputs of Block S132 can be used to determine geometric (e.g., area, perimeter), shape (e.g., circularity, convexity), and texture features for each cell subpopulation identified in Block S132.

In Block S134, constructing a geometric graph functions to enable determination of connectivity-based parameters of the cell populations captured in the set of images. In Block S134, nodes of the set of nodes are preferably defined based upon uniform sampling of each region of the set of regions, and each of the set of edges is preferably formed by constructing a triangulation (e.g., Delauney triangulation, Pitteway triangulation) between nodes of the set of nodes, and weighted by a factor derived from a distance between nodes of the set of nodes. In one variation, each edge is weighted by an inverse of a distance (e.g., geodesic distance) between nodes, wherein the geodesic distance is the shorted path between two nodes constrained by a given region of the set of regions. The geometric graph for each image can, however, be constructed in any other suitable manner, and may, in some variations, omit weighting of edges.

In Block S136 constructing a spatial graph functions to enable determination of spatial parameters of the cell populations captured in the set of images. In Block S136, nodes of the set of nodes are preferably defined based upon determination of a center of mass for each region of the set of regions, and weighted by the area of the corresponding region of the set of regions. Then, each of the set of edges is preferably formed by constructing a triangulation (e.g., Delauney triangulation, Pitteway triangulation) between nodes of the set of nodes, and weighted by a factor derived from a distance between nodes of the set of nodes. In one variation, each edge is weighted by a length (e.g., pairwise distance) between nodes. The spatial graph for each image can, however, be constructed in any other suitable manner.

Figure 5:
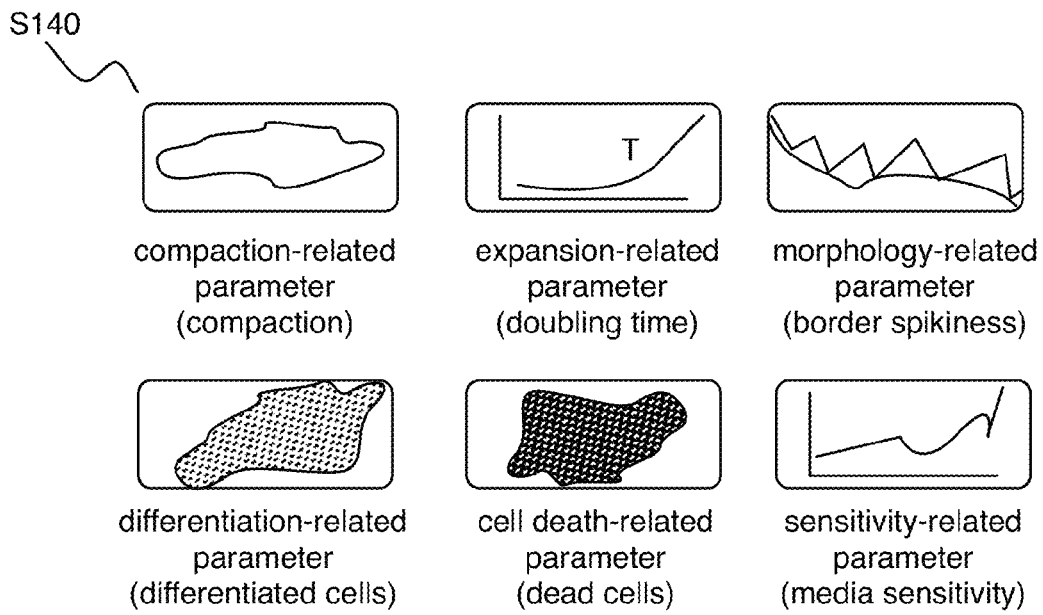
FIG. 5 depicts a variation of a set of parameters in an embodiment of a method for characterizing cell populations.

Block S140 recites: from the analysis, determining a set of parameters characterizing the cell population, which functions to determine parameters that can be used to qualitatively and/or quantitatively measure relevant characteristics of the cell population. Preferably, the set of parameters determined in Block S140 are configured to facilitate determination of quality of the cell population/culture; however, the set of parameters can alternatively be configured to facilitate determination of any other suitable characteristic(s) of the cell population in culture. In one variation, wherein the set of parameters are configured to facilitate determination of quality of the cell population/culture, the set of parameters can include parameters indicative of: degree of cell compaction, cell doubling time, sensitivity to culture media change, colony border spikiness, prevalence of dead cells, and prevalence of differentiated cells, as shown in FIG. 5. Each of these is described in further detail below.

In relation to degree of cell compaction, the presence of flat and/or fully-compacted cells can be used as an indication of healthy cell colonies (e.g., iPSC colonies). As such, Block S140 can include determining one or more compaction-related parameters, from an output of the cell stage classification module of Block S120, that quantify an amount (e.g., percentage, ratio, maximum number, minimum number, etc.) of cells identified as having a full-compaction stage from the set of images. In one variation, a percentage of cells of the cell population identified as having a full-compaction stage can be identified from the cell stage classification module for each image in the set of images, and a compaction-related parameter quantifying full-compaction can be determined by taking the average of percentages across all images in the set of images exhibiting a certain degree of confluency. In a specific example, images exhibiting 70-90% confluency can be used in determination of the compaction-related parameter, wherein percent confluency in the images can be determined by calculating a total area occupied by cell subpopulations in an image (e.g., derived from segmenting the images in Block S132) relative to a total area of view of the image. In an application of the specific example for image data of iPSCs in culture, the appearance of full-compaction cells initiated at approximately a center point of large cell subpopulations (e.g., colonies), and expanded radially outward toward borders of the cell subpopulations. In alternative variations of determination of a compaction-related parameter, the compaction-related parameter can quantify an amount of cells characterized as having a single-cell stage and/or a medium-compaction stage, in a manner similar to that described above.

In relation to cell doubling time, a rate of expansion in the cell population can be used as an indication of healthy cell colonies (e.g., iPSC colonies are expected to follow exponential growth). As such, Block S140 can include determining one or more expansion rate-related parameters, from an output of the cell stage classification module of Block S120, that quantify a rate at which cells of the cell population/subpopulation expand. In one variation, outputs of the cell stage classification module of Block S120 can be used to determine a number of cells per cell stage classification (e.g., single cell, medium-compaction, full-compaction, etc.) within each image, based upon calculating the area occupied by each cell stage classification within an image, and weighting the area by a cell density (e.g., average cell density, tabulated cell density) of each cell stage classification. In a specific example, a module that identified the number of cells for each cell stage classification was trained and validated using a set of phase contrast images with corresponding DAPI-stained images and segmented nuclei, in order to verify the accuracy of the method in determining a cell count. By determining the number of cells per image (e.g., total number, number of each cell stage classification), a number of cells in the cell population per unit time can be determined from the set of images. Then, to determine an expansion rate-related parameter, a measure of cell doubling time can be determined from expression [3], where y is a cell count, y0 is an initial number of cells, t is time, t0 represents a short period of time where the number of cells is relatively constant, and T is the cell doubling time:

$$y(t)=y0 \cdot 2^{(t-t0)/T} \text{ if } t \geq t0; y(t)=y0 \text{ if } t<t0 \quad [3]$$

Figure 6:
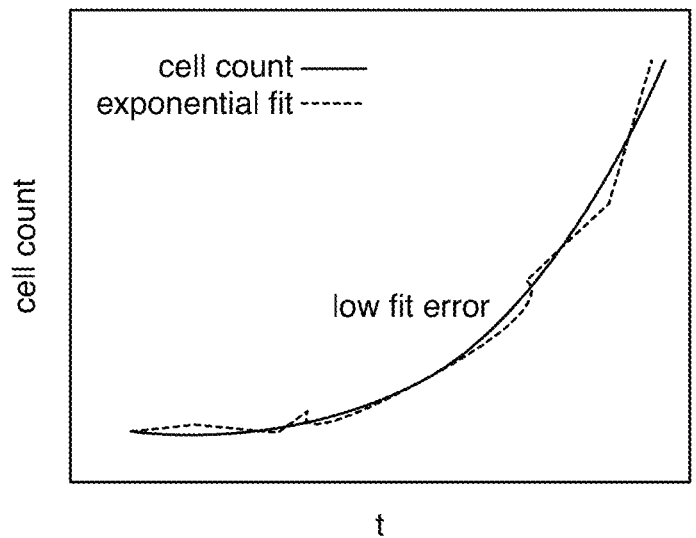
FIG. 6 depicts a variation of a parameter indicative of cell population quality in an embodiment of a method for characterizing cell populations.

In a specific example, as shown in FIG. 6, a fit of expression [3] to actual cell counts over time can be used to determine an exponential fit error, which can be used as a metric for reliability in the estimated cell doubling time, as well as an expansion rate-related parameter for quality of the cell population/culture in Block S140.

In relation to sensitivity to culture media change, a sensitivity of cells to culture media change can be used as an indication of healthy cell colonies (e.g., cell colonies of good quality are expected to be less sensitive to a culture media change). As such, Block S140 can include determining one or more sensitivity related parameters, from an output of the cell cluster segmentation module of Block S130, that quantify a decrease in area exhibited by the cell population/subpopulations in response to culture media changes. For the set of images, a total area occupied by cells in each image can be determined, and decreases in the total area can be tracked and/or aggregated over time to determine a parameter characterizing decreases in area of the cell population (e.g., based upon the number of decreases in total area occupied by cells, based upon the magnitude of decreases in total area occupied by cells). In an example, an enumeration of drops in total area over time is used as a sensitivity-related parameter of Block S140.

In relation to colony border spikiness, spikiness of cell colony borders can be used as an indication of healthy cell colonies (e.g., cells of good quality are expected to exhibit a low degree of spikiness). As such, Block S140 can include determining one or more morphology-related parameters, from an output of the cell graph representation module of Block S130, that quantify a degree of colony border spikiness in the cell population. In one variation, "weak edges", or edges of a set of edges of a geometric graph and/or spatial graph having low weight values (e.g., weight values below a threshold) can be used to determine a quantity related to a lack of cell organization in colonies as a morphology-related parameter. In a specific example, poor organization of colonies (e.g., holes in the colonies), as exhibited by spikiness of borders of cell subpopulations, results in edges with low weight (e.g., edges having high geodesic distance value). In the specific example, a percentage of weak edges (e.g., determined from a comparison between number of weak edges in a set of edges and total number of edges in a set of edges) across images of the set of images exhibiting 70-90% confluency was used as a morphology-related parameter indicative of spikiness in colony borders. However, in variations of the specific example, any other parameter indicative of colony border morphology (e.g., as determined based upon a parameter derived from a number of edges having high weight) can be determined, within images exhibiting any other suitable degree of confluency, in order to provide one or more morphology-related parameters of Block S140.

In relation to prevalence of dead cells, low prevalence of dead cells and/or debris can be used as an indication of healthy cell colonies. As such, Block S140 can include determining one or more cell death-related parameters (e.g., apoptosis-related parameters), from an output of the cell stage classification module of Block S120, that quantify an amount of dead cells in the cell population. In one variation, outputs of the cell stage classification module of Block S120 can be used to determine a number of cells classified as belonging to a dead cell stage within at least one image of the set of images, which can be used to derive one or more cell death-related parameters using data aggregated across the set of images. Additionally or alternatively, outputs of the cell stage classification module of Block S120 can be used to determine a number of cells classified as belonging to a debris stage within at least one image of the set of images, which can be used to derive one or more cell death-related parameters using data aggregated across the set of images. In one example, a percentage of cells belonging to a dead cell stage and a debris stage (e.g., as determined based upon a comparison between an area of an image occupied by dead cells and debris, and a total area of an image occupied by cells) is determined for each image in the set of images, and the average percentage of cells belonging to a dead cell stage and a debris stage across the set of images is used as a cell death-related parameter in Block S140. Any other suitable cell death-related parameter (e.g., aggregate number of dead cells and/or debris determined across the set of images, change in number of dead cells over a duration of time captured in the set of images, etc.) can, however, be used in generating one or more cell death-related parameters of Block S140.

In relation to prevalence of differentiated cells, low prevalence of spontaneously differentiated cells can be used as an indication of healthy cell colonies. Typically, presence of non-pluripotent cells can indicate non-ideal culture conditions and/or poor quality of cell lines (e.g., iPSC lines), which result in spontaneous differentiation of pluripotent cells. As such, Block S140 can include determining one or more cell differentiation-related parameters (e.g., apoptosis-related parameters), from an output of the cell stage classification module of Block S120, that quantify an amount of differentiated cells in the cell population. In one variation, outputs of the cell stage classification module of Block S120 can be used to determine a number of cells classified as belonging to a differentiated stage within at least one image of the set of images, which can be used to derive one or more cell differentiation-related parameters using data aggregated across the set of images. In one example, a percentage of cells belonging to a differentiated stage (e.g., as determined based upon a comparison between an area of an image occupied by differentiated cells, and a total area of an image occupied by cells) is determined for each image in the set of images, and the average percentage of cells belonging to a differentiated stage across the set of images is used as a cell differentiation-related parameter in Block S140. Any other suitable cell differentiation-related parameter (e.g., aggregate number of differentiated cells determined across the set of images, change in number of differentiated cells or non-differentiated cells over a duration of time captured in the set of images, etc.) can, however, be used in generating one or more cell differentiation-related parameters of Block S140.

Other variations of Block S140 can additionally or alternatively include any other suitable parameters indicative of a desired cell culture outcome. For instance, Block S140 can include determination of parameters related to any one or more of: cell potency state (e.g., oligopotent state, multipotent state, pluripotent state, totipotent state, non-potent state) as determined from an output of a cell stage classification module trained to identify cell potency stages; differentiated cell morphology state as determined from an output of a cell cluster segmentation module configured to identify morphological features (e.g., roundedness, flatness, dendritic phenotype, etc.) of individual and clustered cells; cell motility behavior as determined from an output of a module configured to characterize motion behavior (e.g., cilia motion behavior, beating behavior, phagocytosis behavior, etc.) of cells; and any other suitable parameters related to normal or abnormal cell phenotype.

Figure 7:
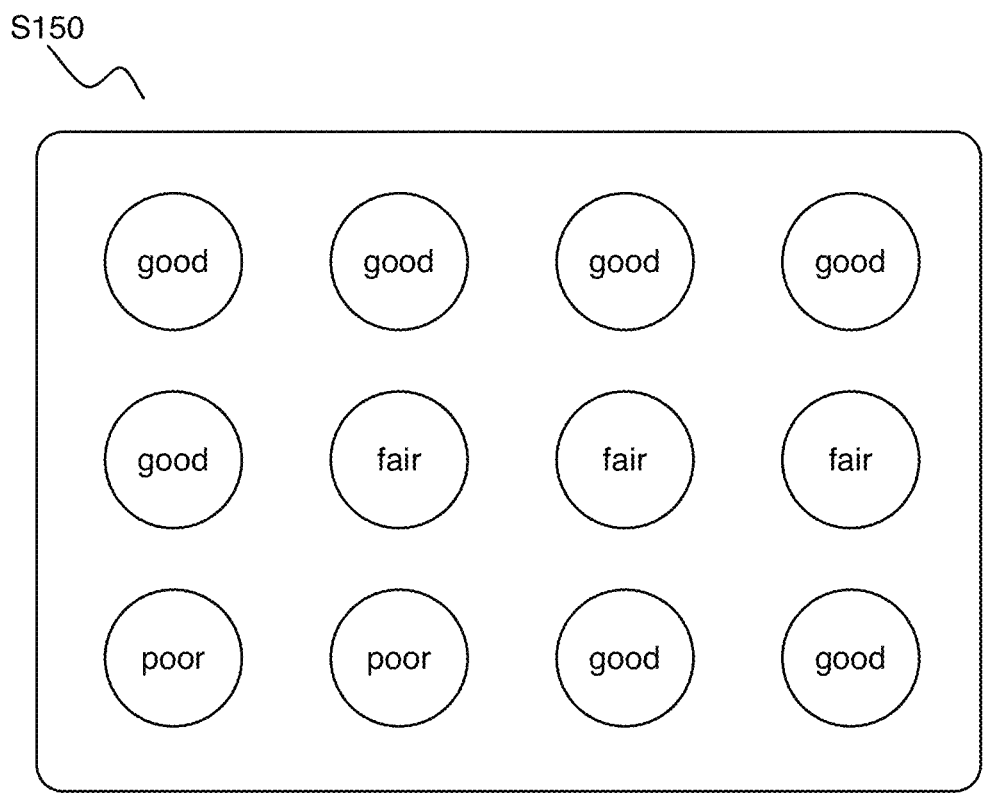
FIG. 7 depicts a variation of a portion of a method for characterizing cell populations.

Block S150 recites: generating an indication of quality of the cell population based upon a comparison between at least one parameter of the set of parameters and a set of reference values, which functions to take the set of parameters as an input into a quality-determining engine, and to output the indication of quality in a consistent and reliable manner. The indication of culture quality can be a qualitative indication (e.g., a verbal description of culture quality), but can additionally or alternatively include a quantitative description of culture quality (e.g., a quantified value of culture quality along a scale of values). In one variation, the quality-determining engine takes parameters related to degree of cell compaction, cell doubling time, sensitivity to culture media change, colony border spikiness, prevalence of dead cells, and prevalence of differentiated cells, as described in Block S140 above, and outputs a ranking of culture quality in a qualitative manner. In an example, as shown in FIG. 7, the output of a quality-determining engine is a three-tiered ranking system for iPSC quality including a first rank of "good" quality, a second rank of "fair" quality, and a third rank of "poor quality". In relation to the set of parameters, in the example, the first rank of "good" quality can be indicated based upon a set of parameters that indicate one or more of: a high amount of cells exhibiting a full-compacted stage, a low doubling time (e.g., approximately 15 hour doubling time), exponential expansion rate, low sensitivity in response to (e.g., small amount of retraction in response to) media change, low colony border spikiness (e.g., indicated in high weights associated with the set of edges), a low amount of dead cells and debris, and a low amount of differentiated cells. In relation to the set of parameters, in the example, the third rank of "poor" quality can be indicated based upon a set of parameters that indicate one or more of: a low amount of cells exhibiting a full-compacted stage, a high doubling time (e.g., higher than 25 hour doubling time), non-exponential expansion rate, high sensitivity in response to (e.g., large amount of retraction in response to) media change, high colony border spikiness (e.g., indicated in low weights associated with the set of edges), a high amount of dead cells and debris, and a high amount of differentiated cells. Finally, the second rank of "fair" quality can be indicated based upon a combination of factors intermediate to those indicative of "good" quality and "poor" quality.

Figure 8:
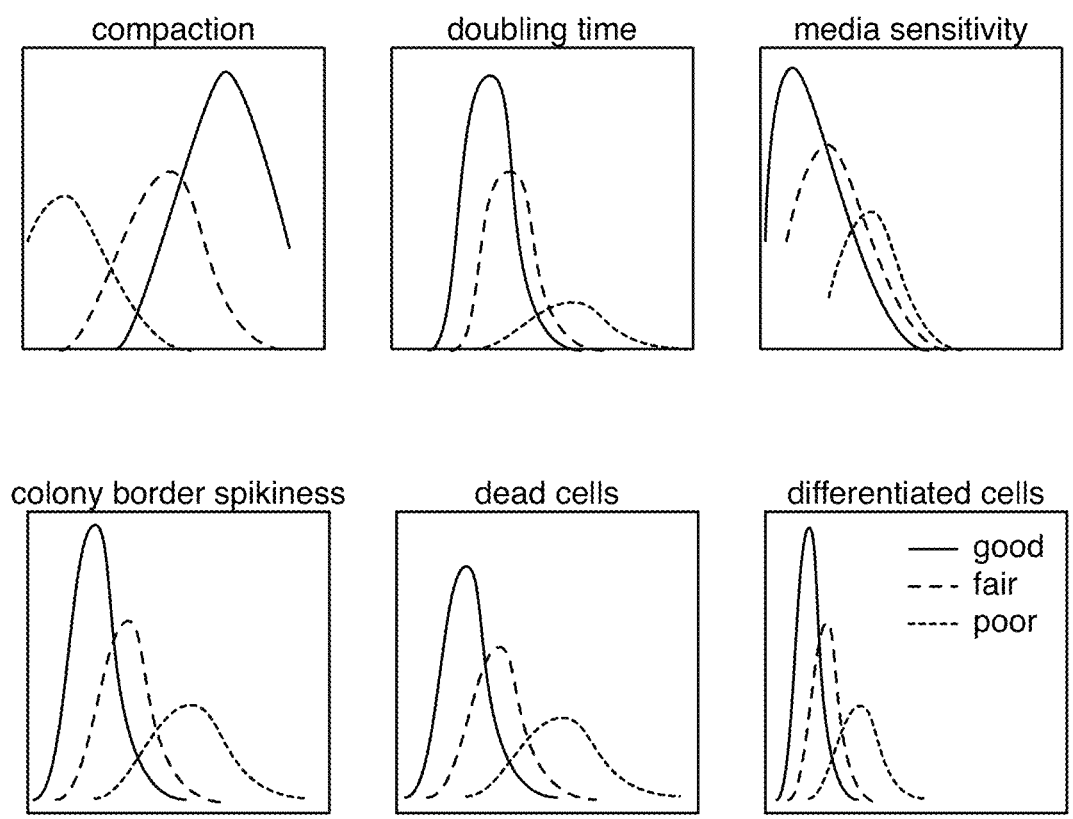
FIG. 8 depicts example distributions of parameters for characterizing cell population quality in an embodiment of a method for characterizing cell populations.

Similar to Block S120, outputs of the quality-determining engine can be trained, validated, and/or optimized according to one or more machine learning algorithms, using a training dataset derived from image data of cell populations labeled independently (e.g., by an experienced entity). In one such example, the quality-determining engine is configured to indicate a ranking of "good" quality if the percent of full-compacted cells (in images exhibiting between 70 and 90% confluency) is greater than 79%, the doubling time is less than 16 hours, there are less than 100 retractions in cell area over a course of 3-4 days in culture, and the percent of weak edges is less than 4% (e.g., as a spikiness threshold). The retractions can be defined as the number of drops in the cell cluster-area over all image frames, although the drops can also be measured over any other parameter describing the expansion of the cells. In the example, the quality-determining engine is configured to indicate a ranking of "poor" quality if the percent of full-compacted cells (in images exhibiting between 70 and 90% confluency) is less than 49%, the doubling time is greater than 25 hours, there are between 100 and 450 retractions in cell area over a course of 3-4 days in culture, or the percent of weak edges is greater than 6% (e.g., as a spikiness threshold). Finally, the quality-determining engine of the example is configured to indicate a ranking of "fair" quality in response to any other set of parameters. In the specific example, parameters with the highest predictive power of quality include parameters related to the degree of cell compaction and the doubling time, followed by parameters related to colony border spikiness and sensitivity to media change. Example distributions of parameters corresponding to "good", "fair", and "poor" quality cultures are shown in FIG. 8. However, any other suitable parameters can be used to generate the indication in Block S150, as determined by a quality-determining engine.

In some embodiments, the method 100 can additionally include Block S160, which recites: generating a notification based upon the indication, which functions to inform an entity associated with the cell population regarding quality of the cell population in culture. The notification is preferably a text-based or email-based notification informing an entity regarding quality of the cell population(s) in culture; however, in other variations, the notification can comprise one or more of: an audio-based notification, a graphic notification, and a haptic notification informing an entity regarding quality of the cell population(s) in culture. Thus, in examples, the notification can be one or more of a text-based notification, an audio-based notification, a graphic notification, and a haptic notification with regard to an indication of cell populations being of "good" quality, of "fair" quality, and/or of "poor" quality. In some variations, the notification can additionally or alternatively be generated upon identification of a transition between different quality states (e.g., good quality to fair quality, good quality to poor quality, fair quality to good quality, fair quality to poor quality, poor quality to good quality, and poor quality to fair quality). In still other variations, the notification can be generated based upon the analysis of Blocks S120 and S130, and/or any other suitable parameter determined during implementation of the method 100.

In variations of the method 100 including Block S160, the method 100 can also include Block S165, which recites: providing the notification at a user interface of an electronic device of a user associated with the cell population. In relation to text-based notifications, the notification can be provided using a message client (e.g., email client, text messaging client, chat client, etc.) of the electronic device (e.g., mobile device, tablet, personal computer, wearable display, etc.). In relation to audio-based notifications, the notification can be provided using a speaker of the electronic device (e.g., mobile device, tablet, personal computer, wearable display, etc.). In relation to graphic notifications, the notification can be provided using a display of the electronic device (e.g., mobile device, tablet, personal computer, wearable display, etc.). In relation to haptic notifications, the notification can be provided using a vibration module (e.g., vibration motor) of the electronic device (e.g., mobile device, tablet, personal computer, wearable display, etc.). The notification can, however, be provided in any other suitable manner in Block S165.

The method 100 can also include Block S170, which recites: characterizing a response of the cell population to a culture environment factor, based upon at least one of the set of parameters. Block S170 functions to determine effects of one or more culture environment factors provided during culture of the cell population and/or subpopulation(s), as captured in time-varying responses of the cell population during culture. The culture environment factor can include any one or more of: a chemical factor (e.g., a therapeutic substance dosage, a growth factor concentration, a neurotransmitter concentration, etc.), a mechanical factor (e.g., variations in substrate, loading under static pressure, loading under cyclic pressure, etc.), an electrical stimulation factor, an oxygen content factor (e.g., hypoxic conditions, etc.), an environmental temperature factor, a cell density factor, and any other suitable environment factor. As such, in variations of Block S170, characterization of a response preferably includes: determining a first set of parameters for at least a cell subpopulation of a cell population determined using variations of one or more of Blocks S120, S130, S140, and S150; providing an environmental factor or a change in environment of the cell population(s) in culture; determining a second set of parameters for at least the cell subpopulation of the cell population determined using variations of one or more of Blocks S120, S130, S140, and S150; and generating a comparative analysis based upon the first set of parameters and the second set of parameters, thereby characterizing a response of the cell population in culture. Alternatively different cells, cell subpopulations, and/or cell cultures can be exposed to different environmental factors, and sets of parameters corresponding to each environmental factor can be determined as in variations of Blocks S120, S130, S140, and/or S150. In Block S170, the response can be characterized based upon generation of parameters from a single cell subpopulation and/or from multiple cell subpopulations of a cell population, and can additionally or alternatively be performed for multiple cell populations. Upon determination of parameters, the comparative analysis can be performed using any suitable statistical method with or without data transformation (e.g., a Box-Cox transformation, etc.) including one or more of: an analysis of variance (ANOVA), a correlational analysis, a comparative analysis, and any other suitable analysis. The analysis of parameters with and without environmental factor treatment can be performed automatically and/or manually. Thus, sets of parameters for different culture conditions can be processed to characterize a response of the cell population to a culture environment factor.

In a first example of Block S170, a culture environment factor including 2 µM of retinoic acid was added to culture media 20 hours prior to a start of imaging of an iPSC culture. In the first example, outputs of Block S120, S130, and S140 indicated rapid cellular differentiation including enlargement and flatting of cells of a cell population, similar to (but not identical to) that of spontaneously differentiated cells. In the first example, outputs of Block S120, S130, and S140 further indicated a reduction in quantities of cells characterized by a medium-compacted and a full-compacted stage over time, relative to a control cell population, as well as an increase in a quantity of cells characterized by a differentiated stage, thereby indicating a low degree of quality of the iPSC culture.

In a second example of Block S170, a set of culture environment factors, including a first culture medium and a second culture medium, were provided to two sets of iPSC cultures with at least two passages prior to imaging. In the second example, outputs of Blocks S120, S130, and S140 indicated that the first culture medium produced a lower quantity of cells characterized by a full-compacted stage relative to the second culture medium. Furthermore, outputs of Blocks S120, S130, and S140 indicated that the first culture medium produced a higher doubling time (e.g., 19.5 hours) in cells relative to the doubling time (e.g., 14 hours) exhibited by cells exposed to the second culture medium. In the second example, however, outputs of Blocks S120, S130, and S140 did not exhibit a significant difference in prevalence of differentiated cells resulting from exposure to the first culture medium and to the second culture medium.

In a third example, culture environment factors including one or more of: a low $CO_2$ state, a decreased temperature, and a decrease in frequency of media changes was provided to an iPSC culture. In the third example, outputs of Block S120, S130, and S140 indicated changes in iPSC cell compaction patterns as well as increased cell death in response to the low $CO_2$ state, a decrease in iPSC expansion and an increase in an amount of spontaneously differentiated cells in response to the decreased temperature, and an increase in sensitivity to media changes in response to the decrease in frequency of media changes.

Figure 9:
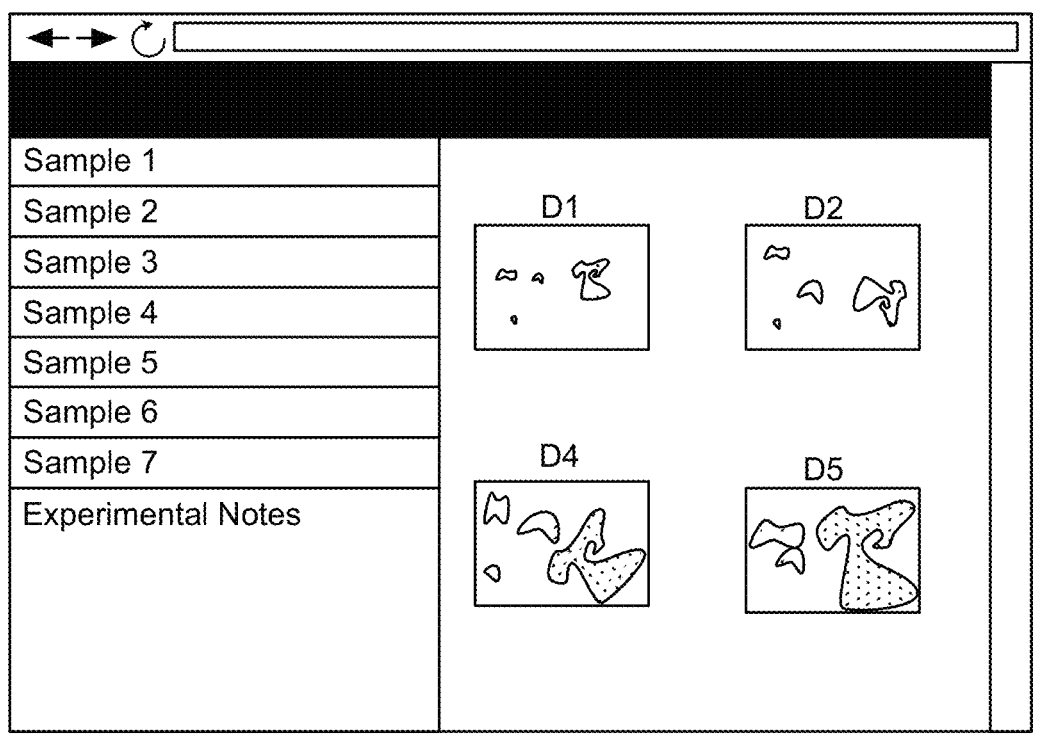
FIG. 9 depicts a user interface in an example of a method for characterizing cell populations.

The method 100 can further include any other suitable blocks or steps that facilitate characterization of a cell population. For instance, the method 100 can include storage of a set of images and/or any element derived from the set of images for instance, in a cloud-based storage module and/or a memory-based storage module. Additionally or alternatively, the method 100 can include providing a transmission to an entity, wherein the transmission can include any one or more of: a rendering derived from the set of images or a subset of set of images (e.g., a rendering of identified cell subpopulations, a rendering of regions corresponding to cell subpopulations of a cell population in culture), a video derived from the set of images or a subset of the set of images (e.g., a video of expansion of a cell subpopulation, a video of a cell culture), a rendering or a video of multiple cell cultures, a rendering derived from one or more of a set of parameters, an analysis derived from values of the set of parameters, an indication of a status of a cell culture (e.g., an indication of confluence, an indication of contamination, an indication of abnormalities, etc.) and any other suitable transmission. The transmission can be provided substantially in real time and continuously, but can alternatively be provided in non-real time and/or non-continuously. The entity can be a human entity (e.g., researcher, clinician, etc.) and/or a non-human entity. Furthermore, in variations, the transmission can be provided at an electronic device (e.g., a mobile device, a tablet, a personal computer, a smart watch, etc.), for instance, by way of a web browser client or an application executing at the electronic device, as shown in FIG. 9.

Additionally, as a person skilled in the field of sample imaging will recognize from the previous detailed description and from the figures and claims, modifications and changes can be made to the embodiments, variations, examples, and specific applications of the method 100 described above without departing from the scope of the method 100.

2. System

Figure 10:
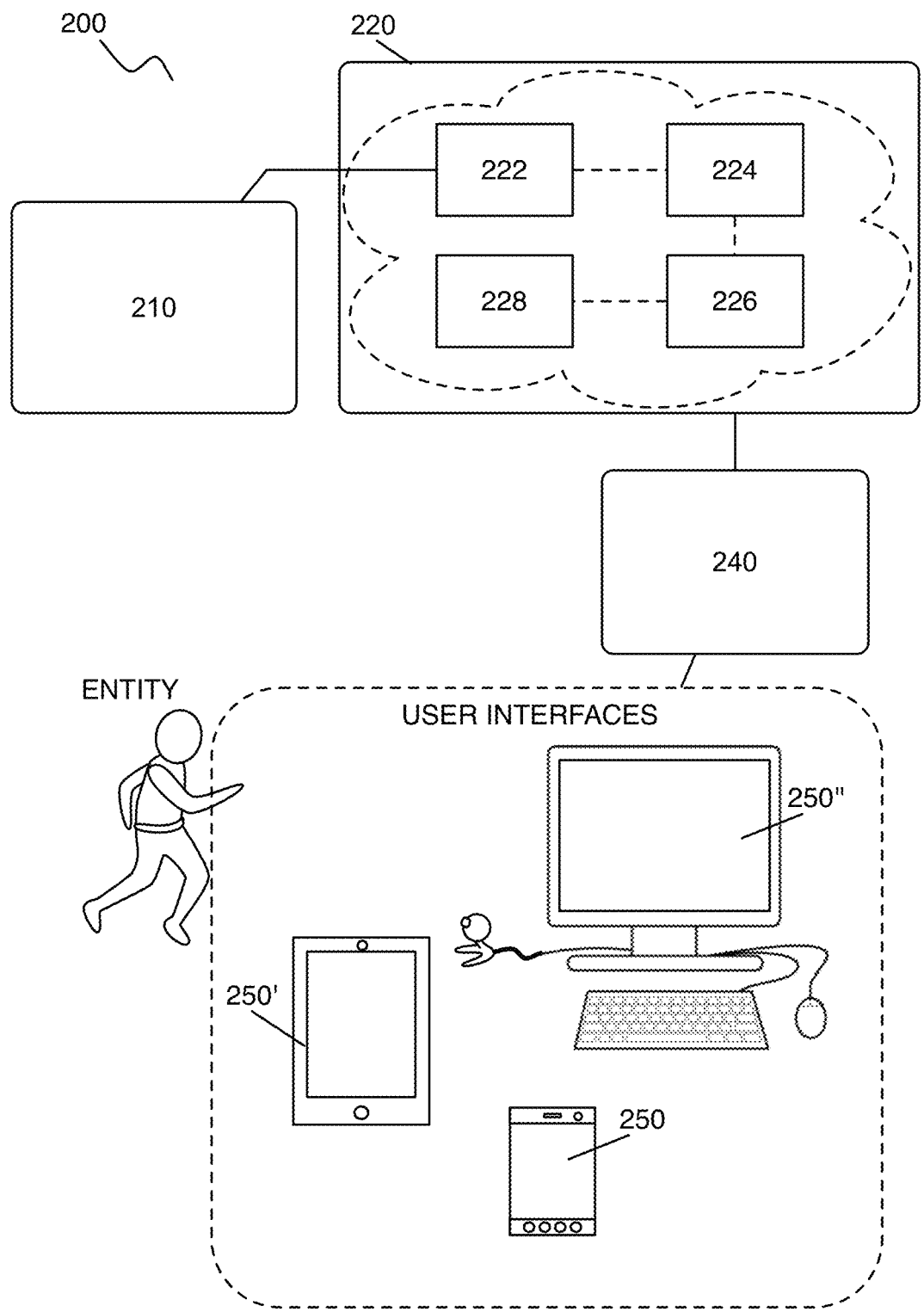
FIG. 10 depicts an embodiment of a system for characterizing cell populations.

As shown in FIG. 10, a system 200 for characterizing cell motion and facilitating cell culture monitoring by a user includes: an imaging module 210 configured to generate an image dataset corresponding to images of the cell population captured at a set of time points; a processing subsystem 220 in communication with the imaging module 210, including: a first module 222 configured to receive the image dataset, a second module 224 configured to generate an analysis of the cell population based upon processing the images according to a cell stage classification module and a cell graph representation module, a third module 226 configured to determine a set of parameters characterizing the cell population from the analysis, and a fourth module 228 configured to generate an indication of quality of the cell population based upon a comparison between at least one parameter of the set of parameters and a set of reference values; and a transmission module 240 coupled to the processing subsystem 220 and configured to transmit at least one of the analysis, the set of parameters, the indication, and video data derived from the image dataset to an electronic device 250 of the user.

The system 200 functions to characterize parameters of cell populations in culture, and to enable phenotypic expressions of a portion and/or an entirety of a cell culture to be assessed over time. The system 200 preferably enables multiple cell subpopulations within each of a set of cell cultures to be assessed; however, the system 200 can additionally or alternatively facilitate characterization of any suitable portion of any number of cell cultures. The system 200 can further allow responses of cell cultures to experimentally applied conditions (e.g., exposure to doses of therapeutic substances) to be assessed at a subpopulation level. Preferably, the system 200 is non-invasive (e.g., cells can be cultured and analyzed without requiring additional treatments due to interaction with the system), and is automated and scalable (e.g., the system can accommodate multiple culture substrates and include actuation).

In a specific application, the system 200 generates and/or receives input data comprising low-light phase-contrast microscopy images of iPSCs in culture. The input data is then processed using computer vision techniques to generate a set of parameters of at least one cell subpopulation of a cell population in culture, wherein the set of parameters can be further processed to extract information regarding cell population or subpopulation quality, including a classification of cell stage. In the specific application, the system 200 can thus classify cells and assess culture quality at a subpopulation level. In variations of the specific application, the iPSCs can be patient sourced or sourced from any other suitable donor, and/or can be cultured with any suitable factor configured to induce a cellular response. However, the system 200 can additionally or alternatively be adapted for characterization of any other suitable cell or tissue culture. The system 200 preferably implements at least a portion of the method 100 described in Section 1 above, which can enable cell cultures to be monitored remotely and characterized automatically; however, the system 200 can additionally be configured to perform any other suitable method.

Figure 11:
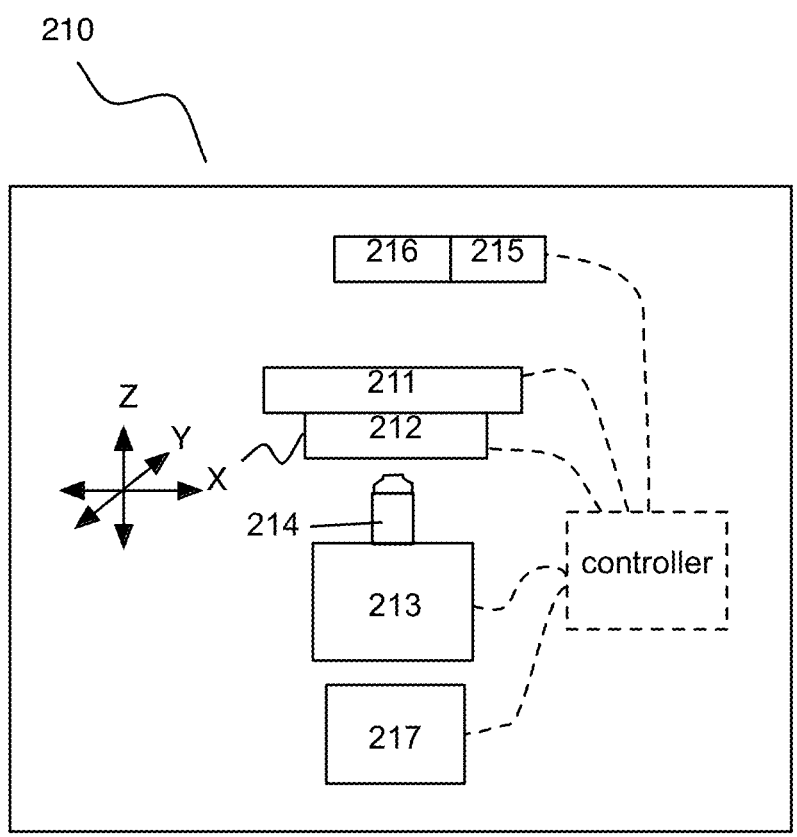
FIG. 11 depicts a variation of a portion of a system for characterizing cell populations.

The imaging module 210 is configured to generate an image dataset corresponding to images of the cell population(s) in culture captured at a set of time points, and functions to generate data from which cell motion in a cell culture can be characterized. The imaging module 210 can be a microscopic imaging module, and in one variation, can be configured for phase-contrast microscopy (e.g., digital inverted phase contrast microscopy). The imaging module 210 can, however, be additionally or alternatively configured for any other suitable type of microscopy (e.g., fluorescence microscopy, brightfield microscopy, darkfield microscopy, etc.). The imaging module can, for example, image Calcium signaling within a cell culture (e.g., cardiomyocyte culture) by fluorescence microscopy. As shown in FIG. 11, the imaging module 210 preferably includes a platform 211 configured to receive at least one cell culture, an optics subsystem 213 configured to facilitate light transmission to and from at least one cell culture at the platform 211, an illumination module 215 configured to transmit light through the optics subsystem 213 toward at least one cell culture at the platform 211; and an optical sensor 217 configured to detect light from at least one cell culture at the platform 211. Imaging by the imaging module 210 can be performed at least in an automated manner, but can additionally or alternatively be implemented in a manual manner. In one example application, a set of imaging parameters specified by an operating entity (e.g., a human entity, a software entity) can direct imaging of the cell culture(s) by the imaging module 210 (e.g., by way of a controller), wherein the controller transitions elements of the imaging module 210 into alignment to properly capture desired windows of view. In the example application, the set of imaging parameters can include any one or more of: type of culture substrate, number and locations of samples per culture substrate, frame rate of capture, duration of image capture per field of view, number of repetitions of image capture, and duration of time elapsed between successive repetitions of image capture. As such, the imaging system 210 can be configured to image multiple cell cultures and/or portions of cell cultures in sequence, in an automated or semi-automated manner.

The platform 211 functions to receive and align at least one cell culture with at least a portion of the optics subsystem 213, and can include or be coupled to a platform control module 212 configured facilitate positioning of the platform or a cell culture relative to other elements of the system 200. The platform 212 preferably includes at least one guide that enables positioning of a culture substrate relative to the platform, but can additionally or alternatively include any other element that facilitates positioning of a culture substrate relative to the platform 211. Preferably, the platform 211 can receive a multi-well culture substrate (e.g., 6-well plate, 12-well plate, 24-well plate, 48-well plate, 96-well plate, slide, etc.), but can additionally or alternatively be configured to receive any other suitable culture substrate or any other suitable number of culture substrates. The platform 211 can include an incubator configured to facilitate control of environment (e.g., $CO_2$ levels, $O_2$ levels) and/or temperature regulation (e.g., with a heating module and a temperature sensor), but can additionally or alternatively be configured to operate without coupling to an incubator. In a specific example, the platform facilitates temperature regulation by way of a thermocouple placed in one sample container at the platform 211, wherein the thermocouple enables temperature feedback control. The platform control module 212 can enable translation and/or rotation of the platform 211 along any suitable number of paths (e.g., linear paths, rotational paths, etc.), and in a specific example includes an actuator configured to provide focus along a z-axis. Furthermore, the platform control module 212 can be automatically and/or manually controlled. The platform can also include electrodes to stimulate (e.g., excite or pace) the cell culture(s) (e.g., cardiomyocyte cell cultures). Other variations of the system 200 can, however, include any suitable number of platforms and/or control modules configured in any other suitable manner.

The optics subsystem 213 includes at least one lens 214 configured to provide focusing and/or magnification, and functions to enable a culture substrate including a cell culture to be properly focused and imaged. The lens 214 of the optics subsystem can include one or more phase objectives configured to provide a suitable magnification to image an object of interest of a cell culture. In one example, the lens 214 is a phase contrast objective that provides 10× magnification; however, any other suitable magnification can be provided (e.g., 5×, 20×, 40×, etc.). The optics subsystem 213 is preferably aligned with the illumination module 215, but can additionally or alternatively include any suitable light directing elements (e.g., light splitting elements, light diverting elements, mirrors, etc.) configured to direct light into alignment with other elements of the system 200. Furthermore, the optics subsystem 213 can include any suitable filter (e.g., excitation filter, emission filter, etc.) configured to condition light transmitted to a cell culture and/or light received from the cell culture.

The illumination module 215 functions to provide illumination to facilitate imaging of at least one cell culture at the platform 211. As such, the illumination module 215 includes a light source 216 configured to transmit light, which may or may not be directed through the optics subsystem 213 toward a cell culture at the platform 211. The light source can provide substantially a single wavelength of light (e.g., a nominal wavelength with any suitable tolerance), but can alternatively provide multiple wavelengths of light, which can be filtered to provide a desired wavelength. In variations wherein a single wavelength of light is provided, the light can be coherent or non-coherent light. In one example, the light source 216 can be a red light emitting diode configured to provide light at a wavelength of 625 nm; however, any other suitable light source can be included in the illumination module 215. Furthermore, the system 200 can include any suitable number of illumination modules and/or light sources configured in any other suitable manner.

The optical sensor 217 is configured to detect light from at least one cell culture at the platform 211, and functions to facilitate generation of the image dataset. The optical sensor 217 can include any one or more of: a complementary metal-oxide semiconductor (CMOS) sensor, a charge coupled device (CCD) sensor, a N-type metal oxide semiconductor (NMOS) sensor, and any other suitable sensor. The optical sensor 217 is preferably configured to capture image data at a frame rate and resolution suitable to capture motion of cells of the cell culture, and in a specific example, is a 1.3 megapixel ⅔" CMOS monochrome sensor configured to capture images at a rate of 1 frame every 30 minutes at a resolution of 640×480 pixels. However, any other suitable frame rate of capture and/or resolution can be provided using the optical sensor 217. The optical sensor 217 can further be coupled to a data link (e.g., wireless data link, wired data link, etc.) configured to transmit image data generated at the optical sensor 217. In some variations, the optical sensor 217 can be situated superior to the platform 211, inferior to the platform 211, and/or in any other suitable configuration relative to the platform 211. Furthermore, the system 200 can include any suitable number of optical sensors 217 configured in any other suitable manner relative to other elements of the system 200.

Variations of the system 200 can, however, incorporate any other suitable module configured to generate data that enable characterization of cell motion. For instance, modules that provide data not characterized as image data can be generated and analyzed in some variations of the system 200.

The processing subsystem 220 is configured to be in communication with the imaging module 210, and is preferably configured to perform at least a portion of the method 100 described in Section 1 above. The processing subsystem 220 is preferably implemented in one or more computing systems, wherein the computing system(s) can be implemented at least in part in the cloud and/or as a machine (e.g., computing machine, server, etc.) configured to receive a computer-readable medium storing computer-readable instructions. In one application, a module of the processing subsystem 220 can be implemented in a machine configured to interface directly with the imaging module (e.g., using a wired or a wireless connection) to receive the image dataset, and transfer the image dataset to a cloud-based computing system configured to perform a majority of an embodiment of the method 100 described above. This configuration can facilitate processing and analysis of large datasets, such as those generated during imaging at a high frame-rate for a large number of samples. In one such example, an experiment with a 12-well culture substrate, with image capture occurring at 1 frame every 30 minutes for 6 locations within each well over 3-4 days, wherein each of the 6 locations has a z-stack (e.g., corresponding to focal planes of imaging) of 7 images, can produce an image dataset on the order of 10,000-100,000 frames. As such, image transfer and processing is more amenable within a cloud-based computing system. However, the processing subsystem can alternatively be configured in any other suitable manner.

The processing subsystem can include: a first module 222 configured to receive the image dataset, a second module 224 configured to generate an analysis of the cell population based upon processing the images according to a cell stage classification module and a cell graph representation module, a third module 226 configured to determine a set of parameters characterizing the cell population from the analysis, and a fourth module 228 configured to generate an indication of quality of the cell population based upon a comparison between at least one parameter of the set of parameters and a set of reference values.

In one variation, as described briefly above, the first module 222 can be implemented in a machine configured to interface directly with the imaging module (e.g., using a wired or a wireless connection) to receive the image dataset, and to transfer the image dataset to the second module 224, which is implemented in a cloud-based computing system. In this variation, the third module 226 and the fourth module 228 can also be implemented in the cloud. However, in other configurations of the processor, the modules can be configured in any other suitable manner. Furthermore, the processor can, however, include any other suitable module(s) configured to enrich outputs provided to another entity. For instance, the processing subsystem 220 can include a module configured to generate an analysis derived from an output of any one or more of the first through the fourth modules 222, 224, 226, 228, and/or a module configured to validate an output of any suitable module.

The transmission module 240 is configured to couple to the processing subsystem 220 and to transmit at least one of the analysis, the set of parameters, the indication, and video data derived from the image dataset to an electronic device 250 of the user. As such, the transmission module 240 can be configured to provide an output that can be provided to the user, by way of a native application or web browser page executing at the mobile device of the user. In examples, the electronic device 250 can be a smart phone, a tablet 250', a smart watch, and/or any other suitable mobile device. Furthermore provision of an output of the processing subsystem 220 can allow an entity (e.g., a research associated with the cell culture(s)) to perform any one or more of: viewing raw image data, making and viewing video derived from the image data (e.g., in real time, in non-real time, continuously intermittently, with playback control, etc.), analyzing data, viewing analyses derived from processing of image data, downloading data and/or video, annotating any suitable output of the processing subsystem 220, and/or performing any other suitable function or manipulation operation. Additionally or alternatively, the transmission module 240 can be configured to transmit any suitable output of the processing subsystem 220 to any other suitable electronic device of an entity, wherein the electronic device includes a user interface configured to provide access to information derived from the processing subsystem 220. In one example, the transmission module 240 can be configured to transmit an output that can be rendered at a website user interface 250", such that an entity (e.g., researcher associated with the cell culture(s)) has access to and/or can manipulate at least one output of the processing subsystem 220.

Variations of the preferred method 100 and system 200 include any combination or permutation of the described components and processes. Furthermore, various processes of the preferred method can be embodied and/or implemented at least in part in the cloud and/or as a machine configured to receive a computer-readable medium storing computer-readable instructions. The instructions are preferably executed by computer-executable components preferably integrated with one or more portions of a controller and/or processor 220. The computer-readable medium can be stored in the cloud and/or on any suitable computer readable media such as RAMs, ROMs, flash memory, EEPROMs, optical devices (CD or DVD), hard drives, floppy drives, or any suitable device. The computer-executable component is preferably a general or application specific processor, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for characterizing a cell population including a set of cell subpopulations, the method comprising:
   at a processing system, receiving image data corresponding to a set of images of the cell population captured at a set of time points;
   at the processing system, generating an analysis based upon processing the set of images according to: a cell stage classification module configured to automatically identify a cell stage of each of the set of cell subpopulations, wherein processing the set of images comprises:
      a partitioning each image in the set of images into a set of pixel subsets, wherein each pixel subset of the pixel subsets corresponds to a cell subpopulation of the set of cell subpopulations,
      producing a set of feature vectors corresponding to the set of pixel subsets for each image, wherein producing comprises, for each pixel subset of the set of pixel subsets:
         generating a local binary pattern histogram associated with the cell subpopulation corresponding to the pixel subset,
         generating a pixel intensity histogram associated with the cell subpopulation corresponding to the pixel subset, and
         generating a feature vector based upon processing of the local binary pattern histogram and the pixel intensity histogram, wherein the set of feature vectors comprises the feature vector; and
      training a machine learning classifier, with a training dataset, to identify each of a set of cell stages of the cell population captured in the set of images, using the set of feature vectors comprising the feature vectors generated based upon processing the local binary pattern histograms and the pixel intensity histograms of the set of pixel subsets;
   from the analysis, determining a set of parameters characterizing the cell population; and
   at the processing system, generating an indication of a characteristic of the cell population based upon a comparison between at least one parameter of the set of parameters and a set of reference values,
   wherein generating the pixel intensity histogram comprises generating the pixel intensity histogram based on the frequency of 1's and 0's from the local binary pattern histogram, and
   wherein generating the feature vector based upon processing of the local binary pattern histogram and the pixel intensity histogram comprises concatenating the local binary pattern histogram and the pixel intensity histogram associated with the cell subpopulation corresponding to the pixel subset.

2. The method of claim 1, wherein receiving image data comprises receiving a set of phase contrast images, for each of a set of locations spanning the cell population at each of the set of time points.

3. The method of claim 1, wherein processing the set of images according to the cell stage classification module comprises enabling identification of at east one of: a single-cell stage, a medium-compaction stage, a full-compaction stage, a dead cell stage, a differentiated cell stage, and a debris stage exhibited by cells of the cell population at the cell stage classification module.

4. The method of claim 1 wherein generating the analysis further comprises processing the set of images according to a cell graph representation module, including:
- at a cell cluster segmentation module, segmenting, from at least one image of the set of images, a set of regions corresponding to the set of cell subpopulations of the cell population, each region defined by a set of nodes and a set of edges, and
- determining a set of parameters characterizing the cell population based upon an analysis of the set of nodes and the set of edges of at least one of the set of regions.

5. The method of claim 4, wherein determining the set of parameters comprises determining parameters indicative of at least one of: degree of cell compaction, cell doubling time, sensitivity to culture media change, and colony border spikiness based upon outputs of at least one of the cell stage classification module and the cell graph representation module.

6. The method of claim 1, further comprising generating a notification based upon the indication and providing the indication to an entity associated with the cell population, at a mobile device of the entity.

7. The method of claim 1, further comprising using an output of the cell stage classification module to determine an expansion rate-related parameter based on a set of weighted areas by density, including:
for each image in the set of images and for each of the set of cell stages, determining an area occupied cells exhibiting the cell stage, and weighting the area by a density corresponding to the cell stage, wherein the set of weighted areas by density comprises the weighted area.

8. The method of claim 1, further comprising using an output of the cell stage classification module to determine a compaction-related parameter, derived from an amount of cells of the cell population exhibiting a compaction stage across a subset of the set of images.

9. The method of claim 1, further comprising using an output of the cell stage classification module to determine a morphology-related parameter indicative of colony border spikiness of the cell population, based upon a quantification of weights associated with the set of edges having values below a threshold value.

10. The method of claim 1, wherein the indication of the characteristic of the cell population comprises at least one of: quality, prevalence of differentiated cells, differentiation stage, cell compaction, and cell border spikiness.

* * * * *

UNITED STATES PATENT AND TRADEMARK OFFICE
CERTIFICATE OF CORRECTION

PATENT NO. : 9,619,881 B2  
APPLICATION NO. : 14/492385  
DATED : April 11, 2017  
INVENTOR(S) : Seyyedeh Mahnaz Maddah and Kevin Loewke Page 1 of 1

It is certified that error appears in the above-identified patent and that said Letters Patent is hereby corrected as shown below:

In the Claims

In Column 24, Line 2, "an area occupied cells" should read, "an area occupied by cells"

Signed and Sealed this
Thirtieth Day of May, 2017

Michelle K. Lee
*Director of the United States Patent and Trademark Office*